(12) United States Patent
Wuerfel, III

(10) Patent No.: US 7,578,534 B2
(45) Date of Patent: Aug. 25, 2009

(54) STRUCTURAL PANEL FOR A REFRIGERATED TRAILER COMPRISING AN INTEGRATED BULKHEAD STRUCTURE FOR PROMOTING AIR FLOW

(75) Inventor: Walter William Wuerfel, III, Clayton, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 345 days.

(21) Appl. No.: 11/266,065

(22) Filed: Nov. 3, 2005

(65) Prior Publication Data
US 2007/0095092 A1 May 3, 2007

(51) Int. Cl.
*B62D 33/00* (2006.01)

(52) U.S. Cl. ............... 296/24.35; 296/186.1; 296/208; 454/118

(58) Field of Classification Search ............ 296/24.35, 296/181.6, 182.1, 186.1, 208; 454/118
See application file for complete search history.

(56) References Cited

U.S. PATENT DOCUMENTS

| | | | |
|---|---|---|---|
| 3,986,317 A | 10/1976 | Mountz | |
| 4,003,728 A * | 1/1977 | Rath | 62/78 |
| 4,139,115 A | 2/1979 | Robinson | |
| 4,358,233 A * | 11/1982 | Morris et al. | 410/127 |
| 4,505,126 A * | 3/1985 | Jones et al. | 62/239 |
| 4,553,403 A * | 11/1985 | Taylor | 62/239 |
| 4,726,196 A * | 2/1988 | Zajic | 62/239 |
| 4,957,521 A | 9/1990 | Cullen et al. | |
| 4,976,490 A | 12/1990 | Gentle | |
| 5,044,689 A | 9/1991 | Evers | |
| 5,161,848 A | 11/1992 | Lutton | |
| 5,403,062 A * | 4/1995 | Sjostedt et al. | 296/181.3 |
| 5,660,427 A | 8/1997 | Freeman et al. | |
| 5,794,402 A | 8/1998 | Dumlao et al. | |
| 5,807,046 A * | 9/1998 | Onken | 410/129 |
| 5,947,812 A * | 9/1999 | Henning et al. | 454/118 |
| 6,023,806 A | 2/2000 | Dumlao et al. | |
| 6,044,607 A | 4/2000 | Dumlao et al. | |
| 6,076,693 A | 6/2000 | Reiter et al. | |
| 6,089,639 A | 7/2000 | Wojnowski | |
| 6,108,998 A | 8/2000 | Dumlao | |

(Continued)

OTHER PUBLICATIONS

Kasmire, R., "Fresh Produce and Perishability," University of California-Davis, posted online (http://www.thepacker.com/rbcs/handbookarticles/properis.htm).

(Continued)

*Primary Examiner*—Dennis H Pedder
(74) *Attorney, Agent, or Firm*—Alston & Bird LLP

(57) ABSTRACT

The invention provides a structural panel with an integrated bulkhead structure for promoting airflow within a refrigerated container, such as a refrigerated trailer. More specifically, the invention provides a front wall portion for a refrigerated container defining an aperture through which a refrigeration device may extend to the interior of the container. The front wall portion includes a bulkhead structure integrally formed with the front wall via a connecting structure defining one or more air ducts for promoting air flow from a floor of the container and up through an inlet of the refrigeration device. The invention also provides a front wall structure that minimizes hot spots in the container front wall by integrally-forming the front wall, connection structure, and bulkhead structure in a single structural component so as to minimize the use of fastener devices.

17 Claims, 5 Drawing Sheets

U.S. PATENT DOCUMENTS

| | | | |
|---|---|---|---|
| 6,299,246 B1 | 10/2001 | Tomka | |
| 6,364,388 B1 * | 4/2002 | Ziegler et al. | 296/24.35 |
| 6,422,642 B1 | 7/2002 | Grimm et al. | |
| 6,439,649 B1 | 8/2002 | Lorenzo et al. | |
| 6,467,118 B2 | 10/2002 | Dumlao et al. | |
| 6,505,883 B1 | 1/2003 | Ehrlich | |
| 6,543,827 B2 * | 4/2003 | Miller | 296/24.35 |
| 6,554,342 B1 | 4/2003 | Burnett | |
| 6,645,333 B2 | 11/2003 | Johnson et al. | |
| 6,676,785 B2 | 1/2004 | Johnson et al. | |
| 6,702,365 B2 | 3/2004 | Semple et al. | |
| 6,745,470 B2 | 6/2004 | Foster et al. | |
| 6,814,397 B2 | 11/2004 | Henderson et al. | |
| 6,843,525 B2 | 1/2005 | Preisler | |
| 6,871,904 B2 | 3/2005 | Bhat et al. | |
| 6,893,076 B1 | 5/2005 | Lewis | |
| 6,902,228 B2 | 6/2005 | Kikuchi | |
| 6,941,875 B2 * | 9/2005 | Norton et al. | 105/397 |
| 6,945,591 B2 | 9/2005 | Durand | |
| 6,945,865 B1 * | 9/2005 | Turek | 454/118 |
| 7,152,911 B1 | 12/2006 | McNulty et al. | |
| 7,322,640 B2 | 1/2008 | Ni et al. | |
| 2006/0043771 A1 * | 3/2006 | Ehrlich | 296/186.1 |
| 2006/0121244 A1 | 6/2006 | Godwin et al. | |
| 2006/0123725 A1 | 6/2006 | Godwin | |
| 2006/0201081 A1 | 9/2006 | Godwin | |
| 2007/0095092 A1 | 5/2007 | Wuerfel, III | |
| 2007/0216197 A1 | 9/2007 | Wuerfel, III | |

OTHER PUBLICATIONS

Kitinoja, L. et al., "Transportation of Horticultural Crops," *Small-Scale Postharvest Handling Practices—A Manual for Horticultural Crops*, 1995, 3$^{rd}$ ed., University of California-Davis, posted online (http://www.fao.org/wairdocs/x5403e/x5403e0a.htm).

Thermo King Corporation (Ingersoll-Rand Company Limited) Air Management Systems product brochure.

* cited by examiner

STRUCTURAL PANEL FOR A REFRIGERATED TRAILER COMPRISING AN INTEGRATED BULKHEAD STRUCTURE FOR PROMOTING AIR FLOW

FIELD OF THE INVENTION

The present invention is directed to a structural element and/or front wall for a refrigerated container (such as a refrigerated trailer) including an integrated bulkhead structure for promoting air flow from a floor of the container upward towards a refrigeration unit intake extending through an aperture defined in the front wall.

BACKGROUND OF THE INVENTION

The temperature regulation of refrigerated containers such as, for example, refrigerated truck bodies and trailers, is managed by maintaining air flow in and out of a refrigeration unit that is often mounted to an outside surface of a front wall of such a container. In most cases, an inlet and outlet of the refrigeration unit extends into the container in order to expel cold air and receive warmer air from the trailer. Thus, warmer air may be drawn into the refrigeration unit from an inside surface of the front wall, cooled by the refrigeration unit, and then expelled from the outlet of the refrigeration unit along the container ceiling, towards a rear wall of the container.

The effective operation of a refrigerated container depends on the effective movement of cold air (expelled from an outlet of the refrigeration unit) throughout the container volume as well as the return of air (from the container volume) into an inlet of the refrigeration unit. In addition, the cooling capacity and/or energy efficiency of such containers is affected by the number of thermodynamic "short circuits" that may be present between the interior volume of the container and the environment outside the container. Such "short circuits" may result from discontinuities in container insulation and/or construction which may be caused by structural and/or mechanical elements of the container, including, but not limited to: fasteners extending through the insulated walls of the container, construction seams in the container structure, damage to the insulated walls of the container, or other discontinuities in the insulating materials of the container.

In order to protect portions of the refrigeration unit that extend into the cargo area of the container, bulkheads are often installed to ensure that cargo in the container does not shift and/or slide forward and impact the inlet and outlet portions of the refrigeration unit. Such bulkheads also serve to maintain a passage for air flow along an inside surface of the front wall of the container. Conventional bulkhead structures in refrigerated containers are attached to the container structure as an accessory structure via a number of fasteners that may, in some cases, extend through the hollow front wall structure of conventional containers, which may contain blown foam serving as an insulating material. Such conventional wall and bulkhead arrangements suffer from several disadvantages. For example, although conventional bulkhead structures may be added as aftermarket accessories that may be tailored to fit various types of containers and to provide air conduits for the refrigeration unit, conventional bulkheads also fill valuable cargo space within the container, as they are not integrated into the structure of a front wall of the container. Furthermore, conventional bulkhead structures are often fastened to the insulating wall structures of a refrigerated container using fasteners that extend through such wall structures and introduce unwanted moisture and thermodynamic "short circuits" into the insulating structure of the container. Furthermore, the front wall structures of conventional containers are often constructed from multiple structural components such as, for example, at least one front wall component and a pair of corner structural elements for connecting the front wall to the side wall of the containers. The seams introduced by conventional front wall construction, as well as the point discontinuities introduced by the fasteners attaching conventional bulkhead structure to such front wall structures, may greatly decrease the overall efficiency and cooling capabilities of a conventional refrigerated container.

Due to the thermal and other inefficiencies (such as added aerodynamic drag on refrigerated truck bodies and/or trailers) introduced by conventional front wall and bulkhead assemblies, larger, heavier, and more costly refrigeration units must often be used in order to maintain a sufficiently cool temperature within the refrigerated container to adequately transport perishable goods. In addition, in order to increase air flow to the refrigeration unit to overcome the thermal inefficiencies outlined above, some aftermarket bulkhead structures are touted as having an increased air capacity. However, as pointed out above, the installation of such aftermarket bulkhead structures (defining large-volume air ducts between the front wall and the bulkhead position), may reduce the usable cargo and/or storage space in the container, resulting in an economic loss to an operator of the container.

Although the use of conventional front wall structures and conventional aftermarket bulkheads suffer from the disadvantages outlined above, their use is still prevalent in refrigerated cargo and storage applications primarily due to availability, relative ease of assembly and adjustability, and because the use of aftermarket accessory bulkheads with convention multi-component container structures (having blown foam insulating filler) is relatively consistent and well-known. However, in light of the shortcomings of these conventional refrigerated container structures, there exists a need in the art for front wall and bulkhead structures that: minimize thermal discontinuities and/or thermodynamic "short circuits;" provide a robust and aerodynamically-efficient front wall and/or bulkhead configuration for refrigerated containers; and provide an adequate airflow to and/or through a refrigeration unit that may be operably engaged with such a wall and bulkhead structure.

BRIEF SUMMARY OF THE INVENTION

The embodiments of the present invention satisfy the needs listed above and provide other advantages as described below. Embodiments of the present invention may include an integrated wall and bulkhead assembly comprising a wall member defining an aperture for receiving an intake and an outlet of a refrigeration device. The assembly may also comprise a bulkhead structure spaced apart from the wall member and operably engaged with the wall member via a connection structure extending between the wall member and bulkhead structure. Furthermore, the wall member, bulkhead structure, and connection structure may be integrally formed and may further cooperate to define at least one duct extending through the connection structure, between the bulkhead structure and the wall member, such that the duct may be in fluid communication with the intake of the refrigeration device for providing an improved air flow into the intake of the refrigeration device. According to some embodiments, the connection structure may comprise a plurality of ribs disposed in spaced relation and extending vertically from an edge of the bulkhead structure to the aperture defined in the wall member.

According to various embodiments of the present invention, the wall member, bulkhead structure, connection structure, and/or other components of the assembly, may comprise at least one composite material such that the assembly may be integrally formed of one or more composite materials. For example, the assembly may comprise one or more composite materials which may include, but are not limited to: fiberglass; polyurethane foam; metal foil sheet; foam insulating material; other composite materials; and combinations of the listed materials.

In order to strengthen and/or further support the assembly, some embodiments of the present invention may further comprise a support frame embedded substantially within the wall member. According to some assembly embodiments, the support frame may comprise a plurality of cross members extending in spaced relation. In some embodiments, the cross members may intersect and/or interconnect to form the support frame. In order to more fully integrate and/or embed the support frame within the wall member, the support frame provided in some embodiments of the present invention may define a plurality of apertures extending therethrough such that at least one component material of the wall member may extend through the apertures. For example, in embodiments wherein the component material is a thermo-formed composite material, the material may flow through the plurality of apertures as the assembly is being formed such that the support frame may be substantially embedded within the wall member. In some other embodiments of the present invention, the support frame may further comprise a plurality of fastener devices extending from the support frame and through an outer surface of the wall member. In such embodiments, the fastener devices may be adapted to couple a refrigeration device to the wall member such that the inlet and outlet of the refrigeration unit may extend through the aperture defined in the wall member. Further, since the support frame may be embedded within the wall member, the fasteners need not extend through the entire thickness of the wall member in order to securely couple the refrigeration device to the wall member.

The bulkhead structure integrally formed with the wall member and connection structure may, in some assembly embodiments, have a first end proximal to an edge of the aperture and a second end distal from the aperture. Furthermore, in order to protect the bulkhead structure, and other components of the assembly, some assembly embodiments may also comprise a plurality of pallet stops extending outward from the wall member proximal to the second end of the bulkhead which may be positioned to ensure that palletized loads do not obstruct the ducts defined in the assembly embodiments of the present invention. Furthermore, the pallet stops may, in some embodiments, further define a flow channel extending therethrough such that the flow channel is in fluid communication with the at least one duct. Finally, in some assembly embodiments of the present invention comprising pallet stops, the pallet stops may further comprise a resilient material operably engaged therewith, for protect the pallet stops from impact forces (resulting, for example, from shifting loads).

In order to provide an aerodynamically-efficient integral assembly, the wall member of some assembly embodiments may also comprise a first outer surface and integrated opposing side portions, wherein the opposing side portions may extend around the bulkhead and define opposing side outer surfaces substantially perpendicular to the first outer surface. The opposing side portions may also comprise a pair of grooves for receiving a corresponding pair of side wall members such that the pair of side wall members extend substantially parallel to the opposing side portions. Furthermore, in order to facilitate the attachment of the integral assembly provided in some embodiments of the present invention, with other structural components, the wall member may define a plurality of grooves extending at least partially therethrough for receiving, for example: a floor member extending substantially perpendicular from the wall member; a roof member extending substantially perpendicular from the wall member; and a side wall member extending substantially perpendicular from the wall member.

Furthermore, according to some assembly embodiments of the present invention, the integral assembly may also comprise a floor member integrally formed with the wall member, bulkhead structure, and connection structure, wherein the floor member extends substantially perpendicular to the wall member. In some embodiments, the integrated floor member may also define at least one channel in fluid communication with the at least one duct such that air flow may be encouraged across the floor member (and under the cargo items and/or palletized loads that may be loaded into a refrigerated container operably engaged with the assembly embodiments of the present invention.

Finally, in some embodiments, the present invention provides a refrigerated container comprising the wall member, bulkhead structure, and connection structure assembly as well as other container components including, for example: a roof member operably engaged with the wall member; a pair of side wall members operably engaged between the wall member, the floor member, and the roof member to form a refrigerated container structure; and at least one rear door operably engaged with at least one of the floor member, the roof member and the side wall members so as to provide a selectively closable loading aperture at a rear portion of the refrigerated container. Thus, according to various embodiments of the present invention, the refrigerated container structure may be used to construct various refrigerated container types, which may include, but are not limited to: a refrigerated tractor trailer; a multipurpose refrigerated container for shipboard, railway, and road transport; a refrigerated railway car; a refrigerated mobile structure; a refrigerated air cargo structure; and combinations thereof.

Thus the various embodiments of the device and method of the present invention provide many advantages that may include, but are not limited to: providing an integrated wall and bulkhead assembly for maintaining an air flow into an intake of a refrigeration unit extending into a refrigerated container; providing an integrated wall and bulkhead assembly having a minimized number of thermodynamic "short circuits" caused by fastener devices that may extend between an interior and exterior of conventional refrigerated containers; providing an integrally-formed front wall and bulkhead assembly with an optimized aerodynamic profile; providing a front wall and bulkhead structure comprising one or more composite materials so as to enable the structure to be integrally formed with a minimum number of fastener devices; and providing an integral frame device embedded within the wall and bulkhead structure for strengthening the structure and operably engaging a refrigeration device to an exterior surface of the integral structure. Some embodiments of the system and method of the present invention provide the added advantage of providing a floor member integrally formed with the wall and bulkhead structure so as to provide an optimized air flow between floor channels defined in the floor member and the ducts defined within the integral wall and bulkhead structure. These advantages, and others that will be evident to those skilled in the art, are provided in the various embodiments of the present invention.

BRIEF DESCRIPTION OF THE SEVERAL VIEWS OF THE DRAWINGS

Figure 1:
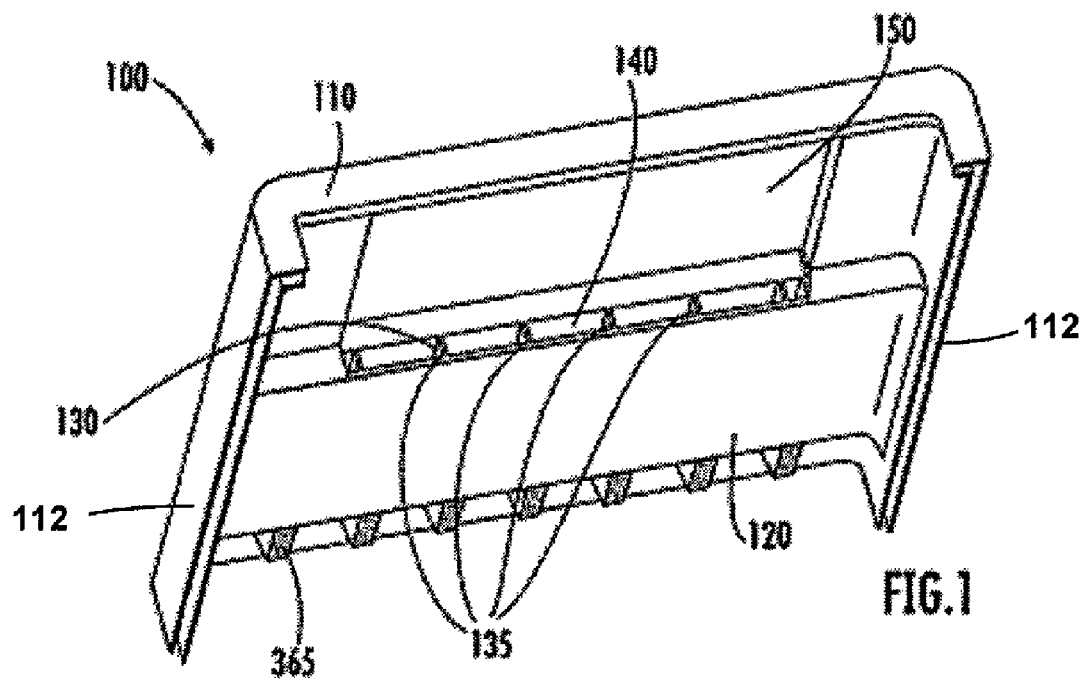
Figure 2:
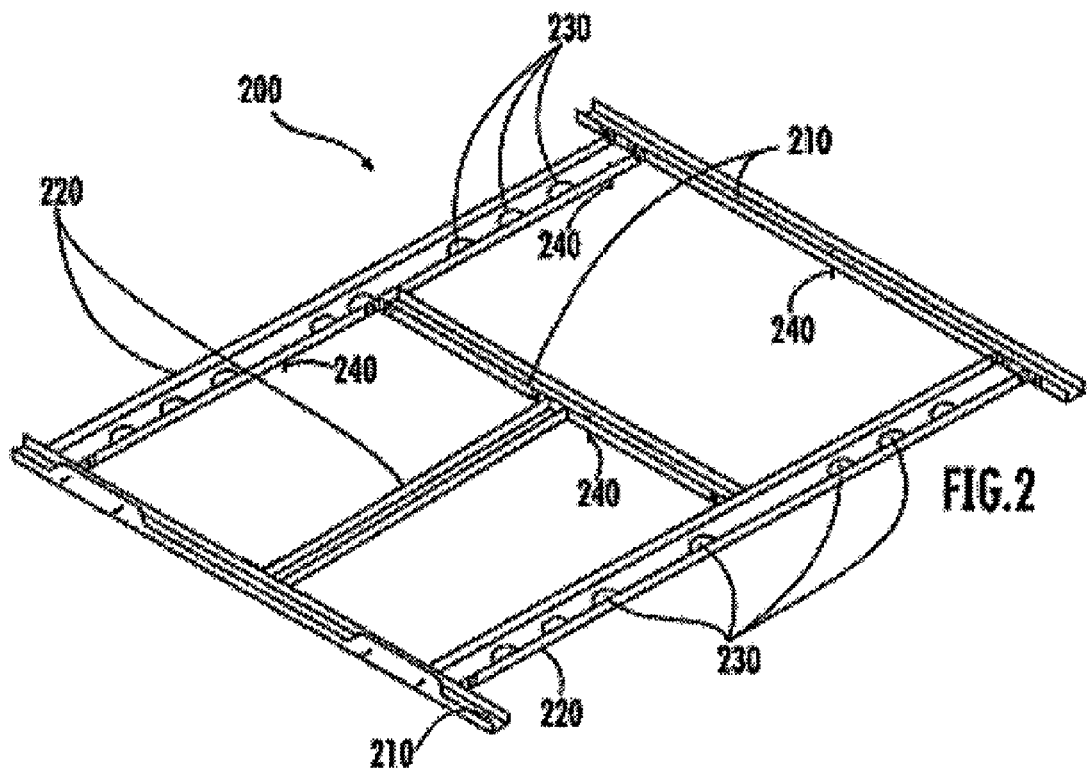
Figure 3:
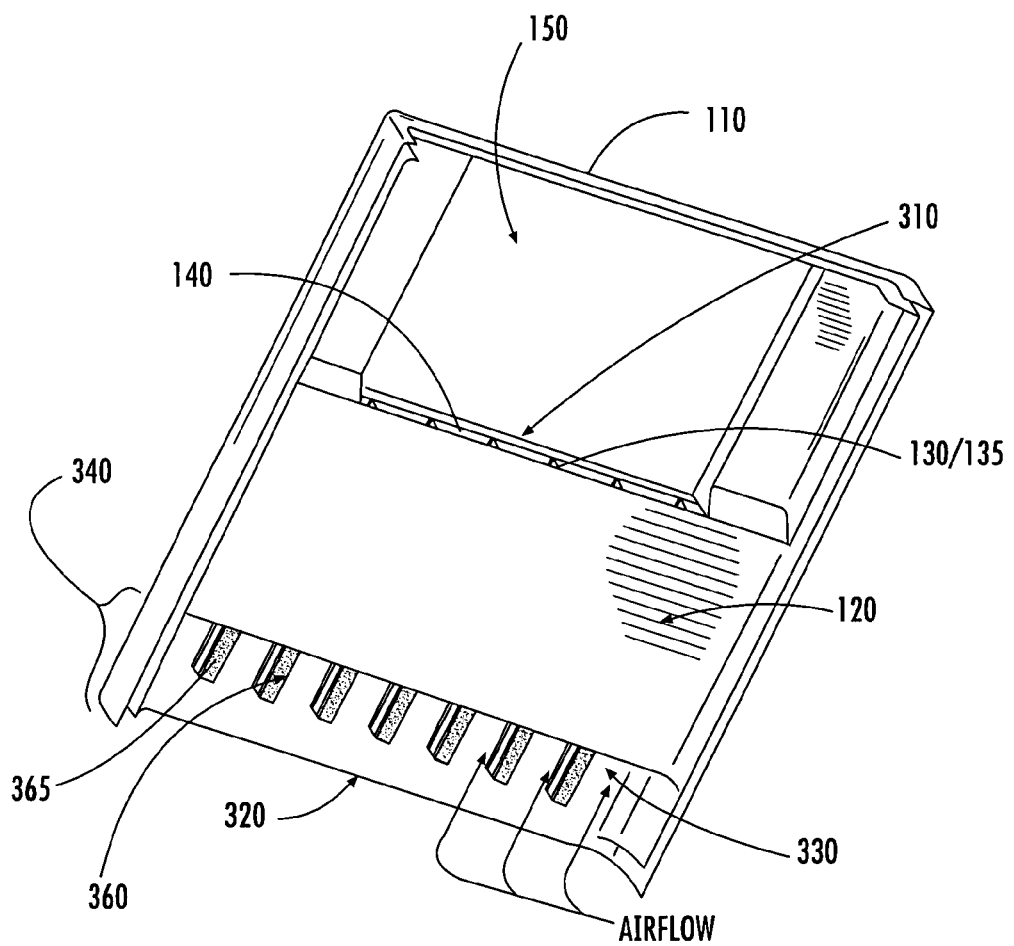
Figure 4:
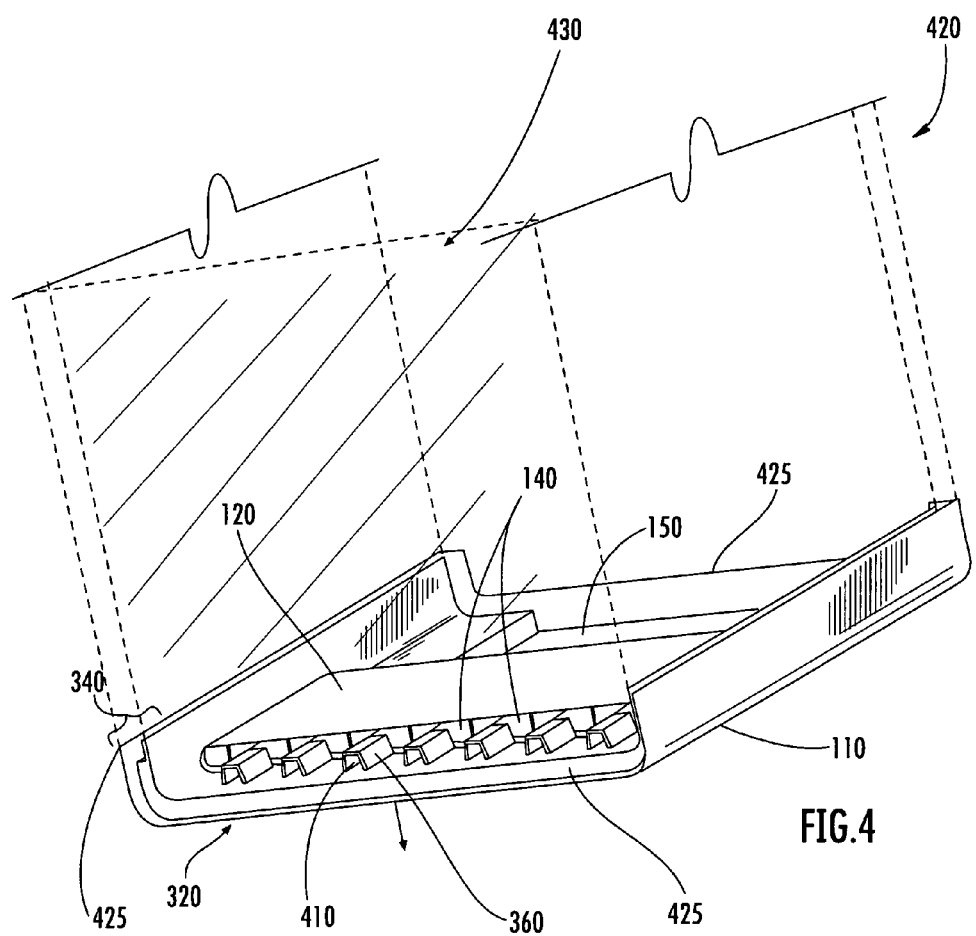
Figure 5:
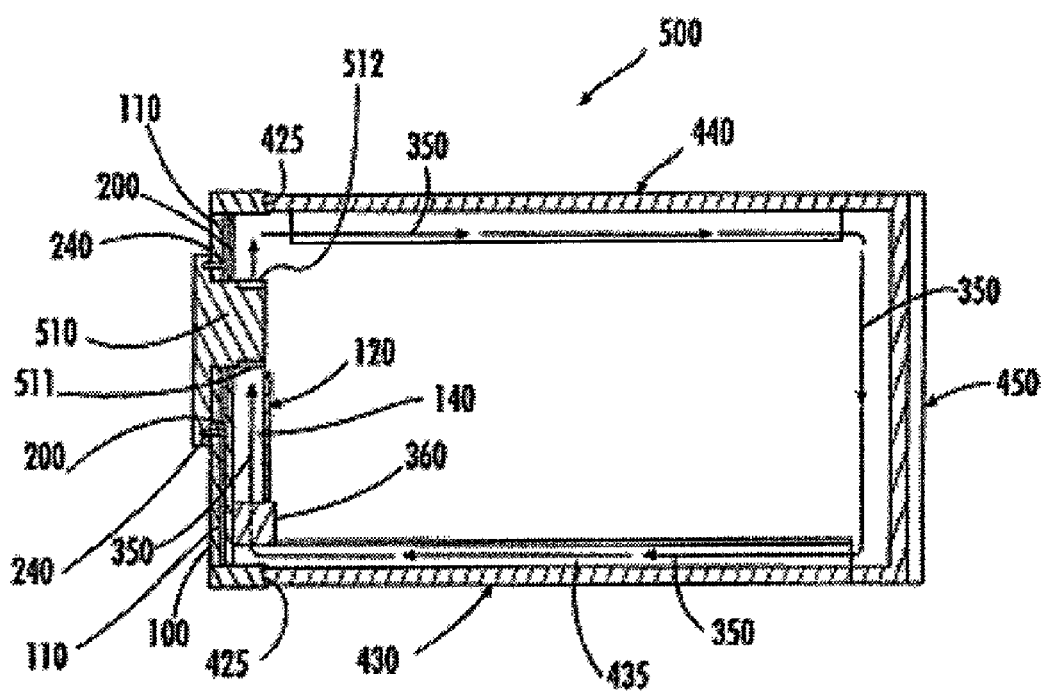
Figure 6:
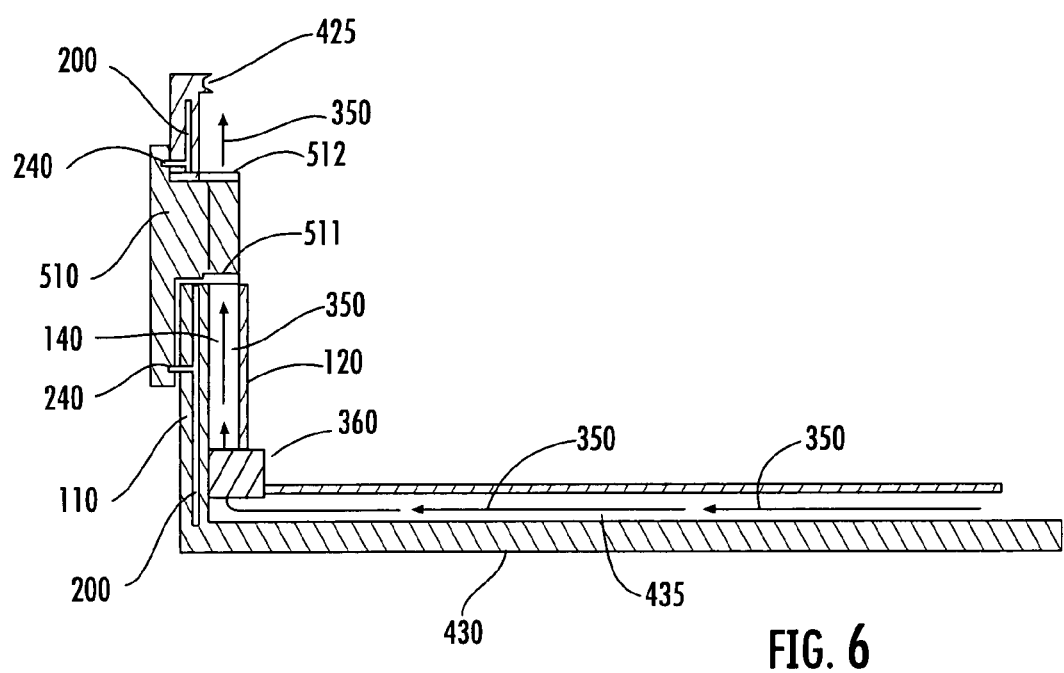

Having thus described the invention in general terms, reference will now be made to the accompanying drawings, which are not necessarily drawn to scale, and wherein:

FIG. 1 is a perspective view of an integrated wall member and bulkhead assembly according to one embodiment of the present invention;

FIG. 2 is a perspective view of a support frame that may be embedded with a wall member according to some embodiments of the assembly and/or refrigerated container of the present invention;

FIG. 3 is a perspective view of an integrated wall member and bulkhead assembly including a bulkhead and integrated pallet stops according to one embodiment of the present invention;

FIG. 4 is a perspective view of an integrated wall member and bulkhead assembly including a bulkhead and integrated pallet stops, wherein the pallet stops define flow channels extending therethrough, according to one embodiment of the present invention;

FIG. 5 is a side cross-sectional view of a refrigerated container including an integrated wall member and bulkhead assembly according to one embodiment of the present invention; and FIG. 6 is a side cross-sectional view of an assembly according to one embodiment of the present invention including a wall member, bulkhead, and integrated floor member.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The singular forms "a," "an," and "the" include plural referents unless the context clearly dictates otherwise.

Although the preferred embodiments of the invention described herein are directed to an integrated wall and bulkhead assembly for a refrigerated trailer, it will be appreciated by one skilled in the art that the invention is not so limited. For example, aspects of the integrated wall and bulkhead design of the present invention can also be incorporated into refrigerated truck bodies, refrigerated containers, refrigerated boxcars, and mobile refrigerated storage units. Furthermore, while the embodiments of the invention described herein are directed to an integrated wall and bulkhead assembly positioned at a front portion of a refrigerated container (such as a refrigerated trailer), it should be understood that the integrated assembly embodiments of the present invention may be used as structural elements that may be used as side walls, roof members, floor members, and/or other structural members of a refrigerated container so as to be capable of supporting a refrigeration device (and/or receiving the inlet and outlet thereof).

Referring to FIG. 1, one embodiment of the present invention provides an integrated wall and bulkhead assembly 100 comprising a wall member 110 defining an aperture 150 extending therethrough adapted for receiving an intake 511 and an outlet 512 of a refrigeration device 510 (see FIG. 5, showing a refrigeration device 510 operably engaged with one embodiment of the assembly 100 of the present invention as part of a refrigerated trailer assembly). As shown in FIG. 1, the assembly 100 may also comprise a bulkhead structure 120 spaced apart from and operably engaged with the wall member 110 via a connection structure 130 extending therebetween. Thus, according to some embodiments of the present invention, the wall member 110, the bulkhead structure 120, and the connection structure 130 may be integrally formed and may cooperate to define at least one duct 140 extending through the connection structure 130, and between the bulkhead structure 120 and the wall member 110, such that the at least one duct 140 may be in fluid communication with the intake 511 of the refrigeration device 510 (as shown generally in FIG. 5). Thus, as shown in FIG. 5, a flow 350 of air may exit the outlet 512 of the refrigeration unit 510, circulate along the roof member 440 of a trailer or other refrigerated container, and return along a floor member 430 and finally up through the at least one duct 140 defined between the wall member 110 and bulkhead structure 120 of the assembly 100 of the present invention. According to various advantageous embodiments of the present invention, the integrated wall member and bulkhead assembly 100 may thus serve to maintain an open passage through which the air flow 350 may pass so as to be capable of easily reentering the inlet 511 of the refrigeration unit 510. Further, the integrated assembly 100 (and the connection structure 130 formed therein) may also serve to protect and maintain the duct 140 defined therein from the incursion of cargo or other obstructions that may otherwise block the air flow 350 entering the inlet 511 of the refrigeration unit 510.

Some embodiments of the assembly 100 of the present invention, as shown generally in FIG. 1, may be integrally formed, using heat, pressure, adhesive materials, and/or other composite material processing steps that will be appreciated by one skilled in the art such that the assembly 100 may be provided in substantially one piece, such that few or no fasteners may be required to form the assembly 100. The term "integrally formed" as used herein is defined as the joining of one or more structural components to form a unitary structure such that the structural components may not be separated by non-destructive means. For example, according to some embodiments, the assembly 100 may be integrally formed using a vacuum infusion process wherein the surfaces of the assembly 100 may be defined by a mold into which material forming the assembly 100 may be vacuum infused. Furthermore, spacer devices (coated in a mold-release material, for example) may also be introduced into the mold in order to prevent the infusion of material into the cavities of the mold defining the ducts 140. In another example, the assembly 100 may be integrally formed from several pultruded sub-assemblies which may be integrally bonded using heat, pressure, and/or adhesives. Furthermore, the connection structure 130 may comprise, as shown in the embodiment of FIG. 1, a plurality of ribs 135 in spaced relation and extending vertically from an edge of the bulkhead structure 120 to a to the aperture 150 defined in the wall member 110. According to other embodiments of the assembly 100 of the present invention, the connection structure 130 may comprise a plurality of spars and/or columns disposed between the wall member 110 and the bulkhead assembly 120 so as to space the two elements apart and define one or more ducts 140 for maintaining an air flow 350 through the assembly 100 (see generally, FIG. 5). According to other embodiments, the connection structure 130 may further comprise a screen, mesh, and or porous material disposed between the wall member 110 and the bulkhead assembly 120 so as to space the two elements apart and define a space for maintaining an air flow 350 the assembly, wherein the space does not necessarily define a duct 140.

According to some embodiments of the present invention, the wall member 110, bulkhead structure 120, and the connection structure 130 may comprise at least one composite material. For example, in some embodiments, the at least one composite material used to form one or more components of the assembly 100 may include, but is not limited to: fiberglass; E-glass; polyurethane foam; metal foil sheet; foam insulating material; composite materials; and combinations thereof. According to one exemplary embodiment, the wall member 110 of the assembly 100 may comprise a sandwich structure comprising several layers of composite material forming a vacuum infused panel, which may include: inner and outer E-glass skin material, a pair of foil layers disposed between the inner and outer fiberglass skin, and a core composed substantially of polyurethane (PU) foam material. According to some embodiments, the bulkhead structure 120 and connection structure 130 may also be composed of the same and/or similar embodiments such that a single set of composite forming steps may be used to generate an integrated assembly 100 (such as that shown generally in FIG. 1) that may require no separate fasteners in order to join the assembly 100 components. In order to maintain sufficient insulating capacity and to ensure the structural soundness of the assembly 100, the wall member may be, in some embodiments approximately 3 inches thick. However, according to various embodiments of the present invention, the thicknesses of the wall member 110, bulkhead assembly 120, and other components of the assembly 100 may be varied in order to optimize the structural capacity of the assembly 100, the insulating quality of the assembly 100, and/or the overall weight of the assembly. Furthermore, the thicknesses and/or density of the wall member 110, bulkhead assembly 120, and/or connection structure 130 may also vary and/or taper over the length and width of the assembly 100. For example, according to one embodiment, the wall member 110 may be provided with a three and one-quarter inch thickness proximal to a floor member 430 and may be expanded to have a four inch thickness proximal to the inlet 511 of the refrigeration unit 510 (see FIG. 5, generally) so as to provide additional volume for air flow proximal to the floor member 430.

FIG. 2 shows a support frame 200 that may be embedded within the wall member 110 according to some embodiments of the present invention (see also FIG. 5, showing a cross-section of the support frame 200 embedded within the wall member 110). The support frame may be used to add rigidity, strength, and/or weight-bearing capacity to the wall member 110 such that the wall member 110 (and the assembly 100 it forms) may serve as an integral structural component of a refrigerated container, trailer, truck, or other structure. For example, as shown in FIG. 5, the wall member 110 may be required to support a refrigeration unit 510 for cooling the interior of a refrigerated container. As one skilled in the art will appreciate, such refrigeration units 510 may weigh hundreds of pounds, such that the support frame 200 may be required, in some embodiments, to provide additional structural strength and/or weight-bearing capacity to the wall member 110 and/or assembly 100. As shown generally in FIG. 2, the support frame 200 may comprise a first plurality of cross members 210 extending in spaced relation in a first direction and a second plurality of cross members 220 extending in spaced relation in a second direction such that the first and second plurality of cross members intersect and interconnect to form the support frame 200 (which may define a large aperture) that may be co-located with the aperture 150 defined in the wall member 110 such that the aperture 150 dimensions may be preserved even in embodiments where the support structure 200 is embedded within the wall member 110. The cross members 210, 220 of the support structure 200 may comprise metals and/or metal alloys selected for strength, corrosion resistance, and/or reduced weight. For example, according to some embodiments of the present invention, the support structure 200 cross members 210, 220 may be formed of aircraft-grade aluminum alloy with cross-section that may have an optimized strength-to-weight ratio. The cross members 210, 220 may also be formed of one or more steels and/or steel alloys or other material types suitable for forming the support structure 200.

Also as shown in FIG. 2, the support frame 200 may define a plurality of apertures 230 extending therethrough such that at least one component material of the wall member 110 may extend through the apertures so that the support frame 200 is more fully integrated with the at least one component material of the wall member 110. The apertures 230 may also provide the added benefit of decreasing the overall weight of the support frame 200. Furthermore, as shown in FIGS. 2 and 5, the support frame 200 may also further comprise a plurality of fastener devices 240 extending from the support frame 200 through an outer surface of the wall member 110. As shown generally in the cross-sectional view of FIG. 5, because the support frame 200 may be embedded within the material of the wall member 110, the fasteners 240 may extend only from a middle portion of the wall member 110 thickness and out through an outer surface of the wall member 110. Thus, according to some embodiments of the assembly 100 of the present invention, the fasteners 240 do not provide a direct thermodynamic "short circuit" between the refrigerated interior of the refrigerated container and an outer surface of the wall member. As discussed generally above and shown in FIG. 5, the fasteners 240 may extend from an outer surface of the wall member 110 and be adapted to couple the refrigeration device 510 to the wall member 110. For example, according to some embodiments of the present invention, the fasteners 240 may be threaded so as to be capable of interacting with a complementary nut and/or washer for securing a flange of the refrigeration unit 510 to an outer surface of the wall member 110 such that an inlet 511 and outlet 512 of the refrigeration unit 510 may extend through the aperture 150 and into the interior of a refrigerated container.

FIG. 3 shows an alternate view of an integrated wall member 110 and bulkhead 120 assembly 100 wherein the bulkhead has a first end proximal to an edge of the aperture 150 and a second end distal from the aperture 150. For example, in some assembly 100 embodiments, the bulkhead 120 may extend from the aperture edge 150 (near the refrigeration unit inlet 511, as shown in FIG. 5) substantially vertically downward towards a bottom portion of the assembly 120 so as to define at least one duct 140 extending substantially from a floor member 430 to the inlet 511 of the refrigeration unit 510. Furthermore, according to some embodiments of the present invention, the assembly 100 may also comprise a plurality of pallet stops 360 extending outward from the wall member 110 proximal to the second end of the bulkhead 120. Thus, referring generally to FIG. 5, the pallet stops 360 may, in some instances prevent palletized loads and/or cargo from sliding forward (along the floor member 430 of the refrigerated container) and obstructing the air flow 350 entering the duct 140 defined by the integrated wall member 110 and bulkhead 120 of the assembly 100 of the present invention. Furthermore, as shown in FIG. 4, the plurality of pallet stops 360 may also each define a flow channel 410 extending through the pallet stops 360 such that the flow channel 410 may be in fluid communication with the at least one duct 140. According to various embodiments of the present invention, the pallet stops may be composed of the at least one composite material used to construct the integrated wall member and bulkhead assembly 100. Furthermore, in some inventions, the pallet stops 360 may also comprise one or more other material types including, but not limited to: extruded aluminum alloy, steel, steel alloy; composite materials; and/or combinations thereof. According to some embodiments, the pallet stops 360 may also comprise a resilient material 365 (see generally, FIG. 3) operably engaged therewith, for protecting the pallet stops 360 from impact forces that may occur, for instance, if a palletized load slides and or shifts and impacts the pallet stops 360. The resilient material 365 operably engaged with the pallet stops may include various resilient materials including, but not limited to: rubber, polymer foam materials, resilient composite materials, polyurethane material; and/or combinations thereof.

As shown generally in FIGS. 1, 3, and 4, the integrated wall and bulkhead assembly 100 may be integrally formed to have a unitary and aerodynamically efficient outer profile such that, in embodiments wherein the assembly 100 forms a front end of a refrigerated container (such as a refrigerated trailer), the outer surface of the assembly 100 may be substantially free of exposed fasteners and/or apertures for receiving fasteners. As shown generally in FIG. 1, according to some embodiments, the wall member 110 of the assembly 100 may comprise a first outer surface and opposing side portions 112, the opposing side portions extending around the bulkhead 120 and defining opposing side outer surfaces substantially perpendicular to the first outer surface. Such embodiments may thus provide an integrated assembly 100 for directly attaching side walls 420 (see FIG. 4, for example) to the assembly 100 without the need for corner (right angle) posts to connect the assembly 100 and the side walls 420. As shown in FIG. 4, some embodiments of the wall member 110 of the present invention may also define a plurality of grooves 425 extending at least partially through the wall member 110. Furthermore, the grooves 425 may be adapted to be capable of receiving and/or operably engaging other structural components which may include, but are not limited to: a floor member 430 extending substantially perpendicular from the wall member 110; a roof member 440 (see FIG. 5) extending substantially perpendicular from the wall member 110; and side wall members 420 (see FIG. 4) extending substantially perpendicular from the wall member 110. The grooves 425 defined in the wall member may be adapted to receive an adhesive material and/or specialized fasteners for operably engaging and/or securing the structural components received therein. Furthermore, as shown in FIGS. 1 and 4, in assembly 100 embodiments comprising a wall member 110 having opposing side portions 112, the side portions 112 may also further comprise a pair of grooves 425 for receiving a corresponding pair of side wall members 420 (see FIG. 4) such that the pair of side wall members extend substantially parallel to the opposing side portions 112.

According to other embodiments of the assembly of the present invention, as shown generally in FIG. 6, the assembly may comprise a wall member 110, bulkhead structure 120, connection structure 130, and a floor member 430 integrated in a single one-piece assembly.

More specifically, the floor member 430 may, in some embodiments, be integrally formed with the wall member 110, bulkhead structure 120, and connection structure 130 such that the floor member 430 may extend substantially perpendicularly to the wall member 110 (as shown generally in FIG. 6). In some embodiments, the integrated floor member 430 may also define at least one channel 435 extending longitudinally in the floor member 430 such that the channel 435 may be in fluid communication with the at least one duct 140 (as shown generally in FIGS. 5 and 6). Thus, as shown in FIGS. 5 and 6, in some assembly embodiments of the present invention, the air flow 350 generated and/or circulated by a refrigeration device 510 operably engaged with the wall member 110 may be directed: (1) along the floor member 430 (and/or through a channel 435 defined therein), (2) upward through a flow channel 410 defined in the pallet stop 360, and (3) upward through the duct 140 defined through the connection structure 130 and into an inlet 511 of the refrigeration device 510. In some embodiments, the channel 435 and/or channels may be defined in material of the floor member 430 such that a palletized load or other cargo item may be supported above the channel 435 and such that the air flow 350 may freely pass along the floor member 430 (as shown generally in FIGS. 5 and 6). In other embodiments, the channels 435 may be covered by a false floor and/or a grating for supporting cargo on the floor member 430. In yet another embodiment, the channels 435 may be defined by a corrugated material (such as a corrugated aluminum panel) that may be placed on and/or operably engaged with the floor member 430.

As shown generally in FIG. 5, the present invention may also comprise, in some embodiments, a complete refrigerated container including the assembly 100 and other structural elements described generally herein. In some embodiments, the refrigerated container may comprise a wall member 110 defining an aperture 150 extending therethough for receiving an intake 511 and outlet 512 of a refrigeration device 510, and a bulkhead structure 120 spaced apart from the wall member 110 and operably engaged with the wall structure 110 via a connection structure 130 extending between the wall member and bulkhead structure. Furthermore, as shown in the assembly 100 embodiment of FIG. 1, the wall member 110, the bulkhead structure 120, and the connection structure 130 may be integrally formed to define at least one duct 140 extending through the connection structure 130 and between the bulkhead structure 120 and the wall member 110 such that the duct 140 may be in fluid communication with the intake 511 of the refrigeration device 510 (see generally FIG. 5).

The refrigerated container embodiments of the present invention may also comprise a floor member 430 integrally formed with the wall member 110. As described above with regard to FIG. 6, the floor member 430 may extend substantially perpendicular to the wall member 110 and may define at least one channel 435 extending longitudinally within and/or parallel to the floor member 430 such that the at least one channel 435 may being in fluid communication with the at least one duct 140.

Furthermore, some refrigerated container embodiments may also comprise other panels and/or structural members for forming the refrigerated container. For example, as shown in FIG. 5, the refrigerated container may comprise: a roof member 440 operably engaged with and extending substantially perpendicular to the wall member 110, and a pair of side wall members 420 (see FIG. 4) operably engaged between the wall member 110, the floor member 430, and the roof member 440 such that the pair of side wall members 420 may also extend substantially perpendicular to the wall member 110 to form a refrigerated container structure. Furthermore, in order to enclose a rear entrance of the refrigerated container, the container may also comprise at least one rear door 450 operably engaged with at least one of the floor member 430, the roof member 440 and the side wall members 420 so as to provide a selectively closable loading aperture at a rear portion of the refrigerated container. According to some refrigerated container embodiments of the present invention, the roof member 440 may also define at least one channel (not shown) extending longitudinally therein such that the at least one channel may be in fluid communication with the outlet 512 of the refrigeration device 510 so as to encourage fluid circulation (such as the air flow 350 shown generally in FIG. 5) between the outlet 512 of the refrigeration device and the rear portion of the refrigerated container. Thus, as shown in the exemplary refrigerated container embodiment of FIG. 5, the air flow 350 may be effectively circulated out of the refrigeration device 510 outlet 512, along the roof member 440 to the rear portion of the container, along a channel 435 defined in the floor member 430, back up through the at least one duct 140 defined by the integral wall member and bulkhead assembly 100 (see FIG. 1) and finally to the inlet 511 of the refrigeration device 510 for recirculation.

As described generally above, the wall member 110, bulkhead structure 120, connection structure 130, and/or floor member 430 may be integrally formed from at least one composite material to form a unitary assembly. The remaining structural components of the refrigerated container embodiments of the present invention (such as the roof member 440, floor member 430, rear door 450, and/or side wall members 420) may also comprise one or more composite materials chosen for optimal insulating and/or structural characteristics. Furthermore, these structural components may also comprise a variety of other materials, which may include, but are not limited to: fiber reinforced polymer material; fiber reinforced polymer composite; a solid laminate, a pultruded or vacuum-infused sandwich panel (e.g., a panel having upper and lower skins with a core therebetween), or a pultruded panel (e.g., a panel having upper and lower skins with vertical or diagonal webs therebetween). Exemplary core materials include wood, foam, and various types of honeycomb. Exemplary polymer resin materials include thermosetting resins, such as unsaturated polyesters, vinyl esters, polyurethanes, epoxies, phenolics, and mixtures thereof. The fiber reinforcing elements may comprise E-glass fibers, although other reinforcing elements such as S-glass, carbon fibers, KEVLAR®, metal (e.g., metal nano-fibers), high modulus organic fibers (e.g., aromatic polyamides, polybenzamidazoles, and aromatic polyimides), and other organic fibers (e.g., polyethylene and nylon) may be used. Blends and hybrids of such materials may also be used as a reinforcing element. Other suitable composite materials that may be used as the reinforcing element include whiskers and fibers constructed of boron, aluminum silicate, or basalt. Exemplary fiber reinforced panels and methods of making such panels are disclosed in the following U.S. patents: U.S. Pat. Nos. 5,794,402; 6,023,806; 6,044,607; 6,108,998; 6,645,333; and 6,676,785, all of which are incorporated herein in their entirety. In addition, according to some embodiments, the structural components of the present invention (such as the roof member 440, floor member 430, rear door 450, and/or side wall members 420) may also comprise a pultruded sandwich panel having a core and two laminated skins secured to opposite sides of the core. An exemplary commercial embodiment of a suitable sandwich panel is the TRANSONITE® composite panels available from Martin Marietta Composites of Raleigh, N.C. According to some embodiments, the core of the sandwich panel may be formed of a foam material with a plurality of fibers extending through the foam and connecting the two laminated skins secured to each opposing surface of the foam core.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An integrated wall and bulkhead assembly comprising:
a wall member defining an aperture extending therethrough adapted for receiving an intake and an outlet of a refrigeration device, the wall member having opposing inner and outer surfaces, the wall member having a support frame substantially embedded therein, the support frame having a plurality of fastener devices extending from the support frame through the outer surface of the wall member without extending to the inner surface of the wall member, the fastener devices adapted to couple the refrigeration device to the wall member;
a bulkhead structure spaced apart from the wall member, and being operably engaged therewith via a connection structure extending therebetween, the connection structure being disposed adjacent the inner surface, the wall member, the bulkhead structure, and the connection structure being integrally formed and cooperating to define at least one duct extending through the connection structure and between the bulkhead structure and the wall member, such that the at least one duct is in fluid communication with the intake of the refrigeration device, the wall member, bulkhead structure, and connection structure forming an integrated assembly constructed of a single piece of vacuum-infused composite material.

2. An assembly according to claim 1, wherein the connection structure comprises a plurality of ribs in spaced relation and extending vertically from an edge of the bulkhead structure to the aperture defined in the wall member.

3. An assembly according to claim 1, wherein the composite material comprises at least one of:
fiberglass;
polyurethane foam;
metal foil sheet;
foam insulating material;
composite materials; and
combinations thereof.

4. An assembly according to claim 1, wherein the support frame comprises a first plurality of cross members extending in spaced relation in a first direction and a second plurality of cross members extending in spaced relation in a second direction such that the first and second plurality of cross members intersect and interconnect to form the support frame.

5. An assembly according to claim 1, wherein the support frame defines a plurality of apertures extending therethrough such that the composite material of the wall member is capable of extending through the apertures so that the support frame is integrated with the composite material of the wall member.

6. An assembly according to claim 1, wherein the bulkhead has a first end proximal to an edge of the aperture and a second end distal from the aperture.

7. An assembly according to claim 6, further comprising a plurality of pallet stops extending outward from the wall member proximal to the second end of the bulkhead.

8. An assembly according to claim 7, wherein each of the plurality of pallet stops define a flow channel extending therethrough such that the flow channel is in fluid communication with the at least one duct.

9. An assembly according to claim 7, wherein the pallet stops further comprise a resilient material operably engaged therewith, the resilient material adapted to protect the pallet stops from impact forces.

10. An assembly according to claim 1, wherein the wall member defines a plurality of grooves extending at least partially therethrough, the grooves adapted to be capable of receiving at least one of:
   a floor member extending substantially perpendicular from the wall member;
   a roof member extending substantially perpendicular from the wall member; and
   a side wall member extending substantially perpendicular from the wall member.

11. An assembly according to claim 1, wherein the opposing side portions further comprises a groove for receiving each side wall member such that the side wall members extend substantially parallel to the opposing side portions.

12. An integrated wall, bulkhead, and floor assembly comprising:
   a wall member defining an aperture extending therethrough adapted for receiving an intake and an outlet of a refrigeration device, the wall member having opposing inner and outer surfaces, the wall member having a support frame embedded therein, the support frame having a plurality of fastener devices extending from the support frame through the outer surface of the wall member without extending to the inner surface of the wall member, the fastener devices adapted to couple the refrigeration device to the wall member;
   a bulkhead structure spaced apart from the wall member, and being operably engaged therewith via a connection structure extending therebetween, the connection structure being disposed adjacent the inner surface, the wall member, the bulkhead structure, and the connection structure being integrally formed and cooperating to define at least one duct extending through the connection structure and between the bulkhead structure and the wall member, such that the at least one duct is in fluid communication with the intake of the refrigeration device, the wall member, bulkhead structure, and connection structure forming an integrated assembly constructed of a single piece of vacuum-infused composite material; and
   a floor member integrally formed with the wall member, bulkhead structure, and connection structure, the floor member extending substantially perpendicularly to the wall member.

13. A refrigerated container according to claim 12, wherein the floor member defines at least one channel extending longitudinally therein, the at least one channel being in fluid communication with the at least one duct.

14. A refrigerated container comprising:
   a wall member defining an aperture extending therethrough adapted for receiving an intake and an outlet of a refrigeration device; the wall member having opposing inner and outer surfaces, the wall member having a support frame substantially embedded therein, the support frame having a plurality of fastener devices extending from the support frame through the outer surface of the wall member without extending to the inner surface of the wall member, the fastener devices adapted to couple the refrigeration device to the wall member;
   a bulkhead structure spaced apart from the wall member, and being operably engaged therewith via a connection structure extending therebetween, the connection structure being disposed adjacent the inner surface, the wall member, the bulkhead structure, and the connection structure being integrally formed and cooperating to define at least one duct extending through the connection structure and between the bulkhead structure and the wall member, such that the at least one duct is in fluid communication with the intake of the refrigeration device, the wall member, bulkhead structure, and connection structure forming an integrated assembly constructed of a single piece of vacuum-infused composite material;
   a floor member integrally formed with the wall member, the floor member extending substantially perpendicular to the wall member and defining at least one channel extending longitudinally therein, the at least one channel being in fluid communication with the at least one duct;
   a roof member operably engaged with the wall member, the roof member extending substantially perpendicular to the wall member;
   a pair of side wall members operably engaged between the wall member, the floor member, and the roof member, the pair of side wall members extending substantially perpendicular to the wall member to form a refrigerated container structure; and
   at least one rear door operably engaged with at least one of the floor member, the roof member and the side wall members so as to provide a selectively closable loading aperture at a rear portion of the refrigerated container.

15. A refrigerated container according to claim 14, wherein the roof member defines at least one channel extending longitudinally therein, the at least one channel being in fluid communication with the outlet of the refrigeration device so as to encourage fluid circulation between the outlet of the refrigeration device and the rear portion of the refrigerated container.

16. A refrigerated container according to claim 14, wherein the support frame comprises a first plurality of cross members extending in spaced relation in a first direction and a second plurality of cross members extending in spaced relation in a second direction such that the first and second plurality of cross members intersect and interconnect to form the support frame; and
   wherein the support frame defines a plurality of apertures extending therethrough such that the composite material of the wall member is capable of extending through the apertures so that the support frame is integrated with the composite material of the wall member.

17. An assembly according to claim 1, wherein the wall member has integrally formed opposing side portions defining opposing outer side surfaces substantially perpendicular to the outer surface of the wall member, and further wherein the bulkhead structure is spaced apart from the wall member such that the opposing side portions extend around the bulkhead structure.

* * * * *

UNITED STATES PATENT AND TRADEMARK OFFICE
CERTIFICATE OF CORRECTION

PATENT NO. : 7,578,534 B2
APPLICATION NO. : 11/266065
DATED : August 25, 2009
INVENTOR(S) : Walter William Wuerfel, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 354 days.

Signed and Sealed this

Seventh Day of September, 2010

David J. Kappos
*Director of the United States Patent and Trademark Office*